(12) United States Patent
Ahiska

(10) Patent No.: US 7,529,424 B2
(45) Date of Patent: May 5, 2009

(54) CORRECTION OF OPTICAL DISTORTION BY IMAGE PROCESSING

(75) Inventor: Yavuz Ahiska, Esher (GB)

(73) Assignee: Grandeye, Ltd., Guildford, Surrey (GB)

( * ) Notice: Subject to any disclaimer, the term of this patent is extended or adjusted under 35 U.S.C. 154(b) by 625 days.

(21) Appl. No.: 10/837,012

(22) Filed: Apr. 30, 2004

(65) Prior Publication Data

US 2005/0007477 A1    Jan. 13, 2005

Related U.S. Application Data

(60) Provisional application No. 60/467,705, filed on May 2, 2003.

(51) Int. Cl.
*G06K 9/40* (2006.01)
*G06K 9/32* (2006.01)
*G02B 13/16* (2006.01)
*G02B 26/08* (2006.01)

(52) U.S. Cl. .................. 382/275; 382/300; 348/335; 359/206

(58) Field of Classification Search ............ 382/254, 382/275; 348/335
See application file for complete search history.

(56) References Cited

U.S. PATENT DOCUMENTS

| | | | |
|---|---|---|---|
| 3,725,563 A | | 4/1973 | Woycechowsky |
| 4,543,601 A | * | 9/1985 | Harada et al. ............ 348/219.1 |
| 4,652,928 A | * | 3/1987 | Endo et al. ............... 348/219.1 |
| 4,667,236 A | | 5/1987 | Dresdner |
| 4,728,839 A | | 3/1988 | Coughlan et al. |
| 4,763,280 A | | 8/1988 | Robinson et al. |
| 4,821,209 A | | 4/1989 | Hempel et al. |
| 5,027,287 A | | 6/1991 | Artigalas et al. |
| 5,067,019 A | * | 11/1991 | Juday et al. ................. 348/580 |

(Continued)

FOREIGN PATENT DOCUMENTS

EP    1120746 A2  *  8/2001

(Continued)

OTHER PUBLICATIONS

Comaniciu, D., Ramesh, V., and Meer, P., "Real-Time Tracking of Non-Rigid Objects Using Mean-shift." IEEE Computer Vision and Pattern Recognition, vol. 1 II, 2000, pp. 142-149.

(Continued)

*Primary Examiner*—Jingge Wu
*Assistant Examiner*—Jose M Torres
(74) *Attorney, Agent, or Firm*—Groover & Associates

(57) ABSTRACT

An optical system comprising the following. A camera that is capable of reducing distortion from an optical system has an optical system that is configured to capture a wide field of view of a subject. An image sensor and circuitry are coupled to the optical system and are configured to convert the output of the optical system to electrical signals suitable for use by an image processing circuit. The image processing circuit is coupled to the image sensor and is configured to reduce optical distortions from the combination of the optical system and the image sensor where the correction includes reference to a table of parameters held in a solid-state memory, attached to said image processing circuit, wherein the table of parameters may be specific to the particular combination of said optical system and said image.

20 Claims, 4 Drawing Sheets

U.S. PATENT DOCUMENTS

| | | | |
|---|---|---|---|
| 5,185,667 A | | 2/1993 | Zimmermann |
| 5,321,776 A | | 6/1994 | Shapiro |
| 5,359,363 A | | 10/1994 | Kuban et al. |
| 5,396,284 A | | 3/1995 | Freeman |
| 5,434,617 A | | 7/1995 | Bianchi |
| 5,489,940 A | * | 2/1996 | Richardson et al. .......... 348/315 |
| 5,495,292 A | | 2/1996 | Zhang |
| 5,666,157 A | | 9/1997 | Aviv |
| 5,684,937 A | | 11/1997 | Oxaal |
| 6,049,281 A | | 4/2000 | Osterweil |
| 6,147,709 A | | 11/2000 | Martin et al. |
| 6,215,519 B1 | * | 4/2001 | Nayar et al. ................ 348/159 |
| 6,243,099 B1 | | 6/2001 | Oxaal |
| 6,243,131 B1 | * | 6/2001 | Martin ......................... 348/36 |
| 6,344,852 B1 | | 2/2002 | Zhu |
| 6,345,129 B1 | * | 2/2002 | Aharon ....................... 382/284 |
| 6,509,926 B1 | | 1/2003 | Mills et al. |
| 6,724,421 B1 | | 4/2004 | Glatt |
| 6,738,057 B1 | * | 5/2004 | Campbell ................... 345/611 |
| 6,757,434 B2 | | 6/2004 | Miled et al. |
| 6,763,068 B2 | | 7/2004 | Oktem |
| 6,845,190 B1 | * | 1/2005 | Smithwick et al. ........... 385/25 |
| 7,202,888 B2 | * | 4/2007 | Tecu et al. ............ 348/208.11 |
| 7,224,392 B2 | * | 5/2007 | Cahill et al. ................ 348/315 |
| 2002/0122117 A1 | * | 9/2002 | Nakagawa et al. .......... 348/218 |
| 2002/0154240 A1 | * | 10/2002 | Tamai et al. ................ 348/345 |
| 2003/0063815 A1 | * | 4/2003 | Watanabe ................... 382/255 |
| 2003/0128756 A1 | | 7/2003 | Oktem |

FOREIGN PATENT DOCUMENTS

| | | |
|---|---|---|
| EP | 1 341 383 A2 | 9/2003 |
| WO | WO 02/062056 A1 | 8/2002 |

OTHER PUBLICATIONS

Y. Yardimci, I. Yilmaz, A. E. Cetin, "Correlation Tracking Based on Wavelet Comain Information," Proceedings of SPIE vol. #5204, San Diego, Aug. 5-7, 2003.

A M. Bagci, Y. Yardimci, A. E. Cetin, "Moving Object Detection Using Adaptive Subband Decomposition and Franctional Lower-Order Statistics in Video Sequences," Signal Processing, 82 (12): 1941-1947, Dec. 2002.

C. Stauffer, W. Grimson, "Adaptive Background Mixture Models for Real-Time Tracking." Proc. IEEE CS Conf. on Computer Vision and Pattern Recognition, vol. 2, 1999, pp. 246-252.

"A System for Video Surveillance and Monitoring," in Proc. American Nuclear Society (ANS) Eighth International Topical Meeting on Robotics and Remote Systems, Pittsburgh, PA, Apr. 25-29, 1999 by Collins, Lipton and Kanade.

Aube, 12th International Conference on Automatic Fire Detection, 2001.

X. Zhou, R. Collins, T. Kanade, and P. Metes, "A Master-Slave System to Acquire Biometric Imagery of Humans at Distance", ACM International Workshop on Video Surveillance, Nov. 2003.

* cited by examiner

Normal (1)     Pincushion distortion (2)     Barrel distortion (3)

value = c(bA + aB) + d(bC + aD)

CORRECTION OF OPTICAL DISTORTION BY IMAGE PROCESSING

CROSS-REFERENCE TO RELATED APPLICATIONS

This application claims the benefit of U.S. Provisional Application No. 60/467,705 filed on May 2, 2003.

The present application is related to the following U.S. patent applications:

U.S. patent application Ser. No. 10/837,355, entitled "Multiple View Processing in Wide-Angle Video Camera", filed on even date herewith and assigned to the assignee of the present invention.

U.S. patent application Ser. No. 10/837,326, entitled "Multiple Object Processing in Wide-Angle Video Camera", filed on even date herewith and assigned to the assignee of the present invention.

U.S. patent application Ser. No. 10/837,019, entitled "Method and System of Simultaneously Displaying Multiple View for Video Surveillance", filed on even date herewith and assigned to the assignee of the present invention.

FIELD OF THE INVENTION

This application relates generally to cameras and specifically to the design of a camera that corrects distortion introduced by optical components which can capture wide field of view.

BACKGROUND OF THE INVENTION

Different lens/image sensor combinations produce different types and degrees of distortion. This distortion makes viewing or interpreting an image difficult. Furthermore, an optical system may be designed in with distortions to provide a specific field of view.

Accordingly, what is needed is a system and method for reducing and correcting distortion in lens/image sensor combinations.

SUMMARY OF THE INVENTION

In preferred embodiments, the present inventions are implemented using a camera comprising the following. A camera that is capable of reducing distortion from an optical system has an optical system that is configured to capture a wide field of view. An image sensor and circuitry are coupled to the optical system and are configured to convert the output of the optical system to electrical signals suitable for use by an image processing circuit. The image processing circuit is coupled to the image sensor and is configured to reduce optical distortions from the combination of the optical system and the image sensor where the correction includes reference to a table of parameters held in a solid-state memory, attached to said image processing circuit, wherein the table of parameters may be specific to the particular combination of said optical system and said image.

BRIEF DESCRIPTION OF THE DRAWING(S)

DETAILED DESCRIPTION OF THE INVENTION

The invention relates generally to video cameras and specifically to the design of a camera that corrects distortion introduced by optical components. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the invention is not intended to be limited to the embodiment shown but is to be accorded the widest scope consistent with the principles and features described herein.

The invention includes image-processing circuitry and discloses how the parameters used in the correction may be obtained automatically or manually. Correction of optical distortion has many advantages including, but not limited to, the possibility of achieving high quality images from low cost optical systems. The invention applies equally to still and video cameras.

Figure 1:
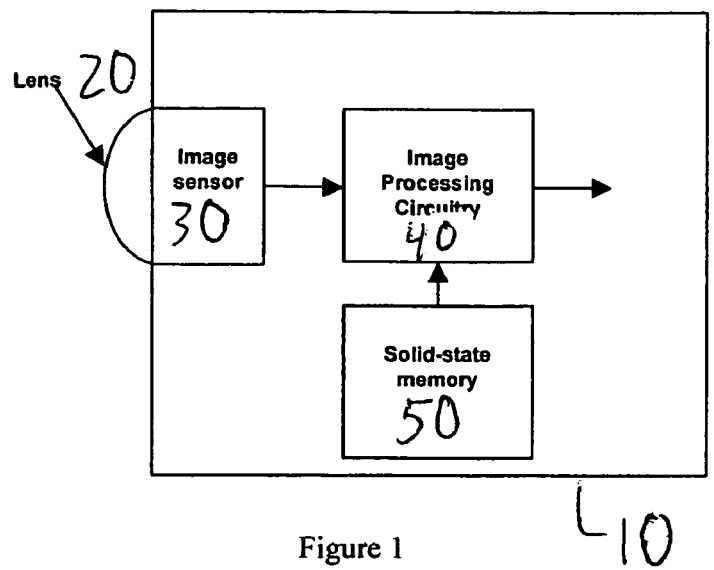
FIG. 1 is a block diagram illustrating one embodiment of the invention.

FIG. 1 is a block diagram illustrating one embodiment of the invention. Camera 10 includes optical system 20, for example lenses and mirrors in various combinations, image sensor and circuitry 30, image processing circuit 40, and solid-state memory 50. In normal operation, optical system 20 projects a view of the scene under observation onto image sensor 30. Examples of image sensor 30 include a charge-coupled display (CCD) or complementary metal-oxide semiconductor (CMOS) device. Image sensor 30 converts the light falling upon it into electrical signals that the supporting circuitry converts to a form suitable for use by image processing circuit 40. This conversion would typically include conversion from an analog signal to a digital signal of an appropriate format. In an alternative embodiment the optical system may include a parabolic mirror.

In one embodiment image processing circuit 40 is implemented in a programmable device such as a digital signal processor, for example Texas Instruments TMS320C6414, which may be used to execute other algorithms upon the image including, but not limited to, sharpening, contrast adjustment, color adjustment, and resizing. It should however be clear to those skilled in the art that the algorithms mentioned here may be implemented with a combination of fixed-function and programmable hardware, or solely by fixed-function hardware.

Figure 2:
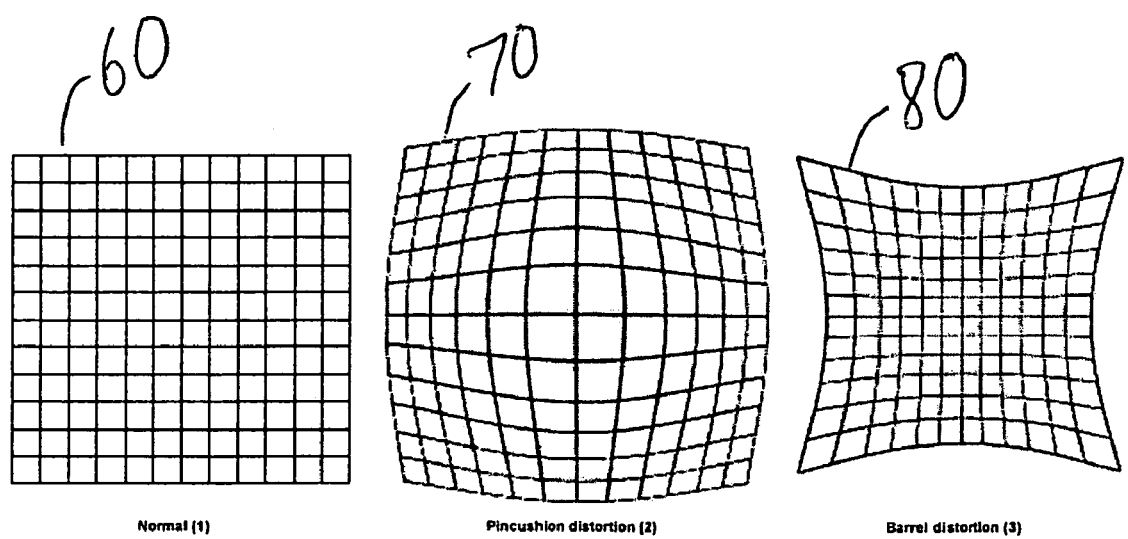
FIG. 2 is a diagram illustrating normal, pincushion distortion and barrel distortion patterns.

FIG. 2 is a diagram illustrating normal, pincushion distortion and barrel distortion patterns. The type of distortion corrected by the invention is termed geometric distortion caused by different areas of the optical system having different focal lengths and different magnifications. This is characterised by the warping of horizontal or vertical lines. Pattern 60 illustrates a square grid pattern, while pattern 70 illustrates one example of a square grid pattern subject to pincushion distortion and pattern 80 illustrates one example of a square grid pattern subject to barrel distortion. Distortion may be introduced into the optical system through manufacturing processes or intentionally in order to alter or enhance the field of view. The invention corrects pincushion and barrel distortion as well as distortion that may be reduced by a compensating geometric distortion, including that introduced by a fish-eye lens. The purpose of this invention is to capture the nature of this distortion and use image-processing techniques to correct it. The invention is applicable to cameras that contain an imaging system and a processing circuit.

The distortion is corrected by reference to a table held in a solid-state memory that indicates the mapping between pixels (i.e. picture elements, an individual dot in the image) of the distorted image and pixels of the correct image. This mapping table may be constructed for each optical system or batch of systems produced, hence removing the need for high accuracy components. The mapping table may be specific to a particular lens/image sensor combination, a type of lens or a type of image sensor, and so on. Additionally, the mapping table may stored within the lens and loaded in to the camera upon attachment of the lens to the camera.

Figure 3:
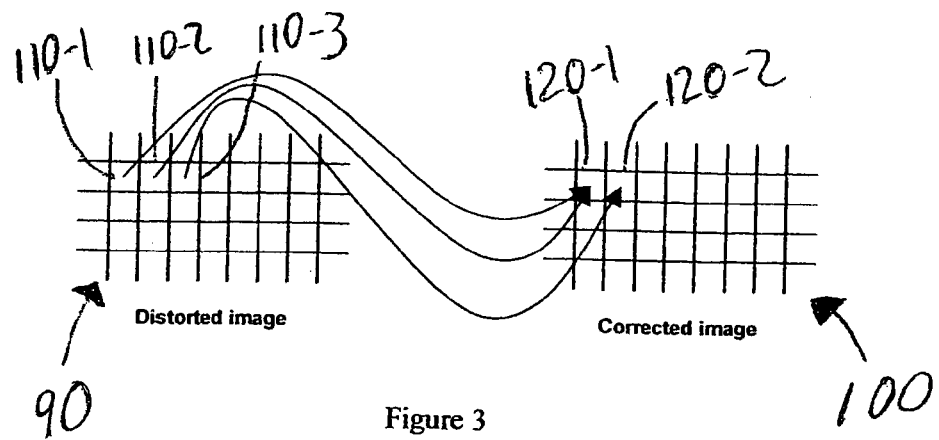
FIG. 3 is a diagram illustrating a graphical version of a forward mapping table.
Figure 4:
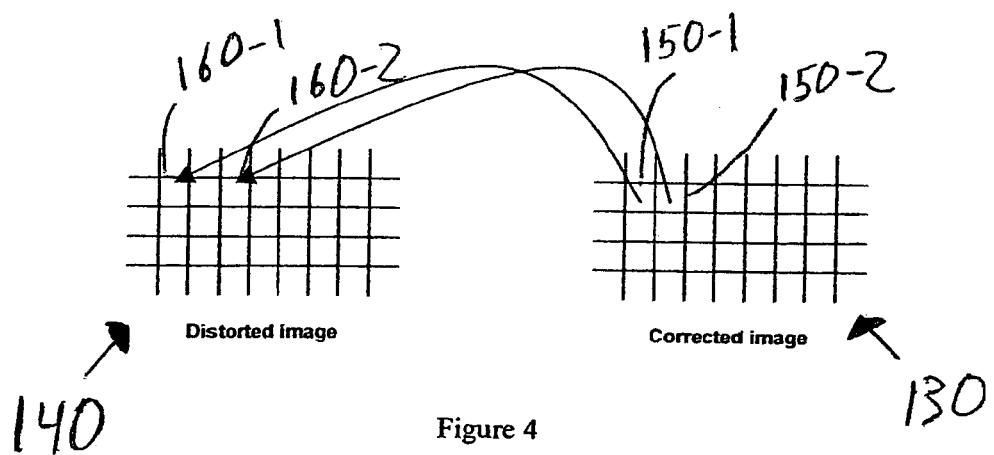
FIG. 4 is a diagram illustrating a graphical version of a reverse mapping table.

The table is typically one of two types: it may be a forward table in which the mapping from distorted image to correct image is held (see FIG. 3), or it may be a reverse table holding the mapping from correct image to distorted image (see FIG. 4). FIG. 3 is a diagram illustrating a graphical version of a forward mapping table. Every pixel in distorted image 90 may be mapped to corrected image 100 using the forward mapping table, and each entry may result in the mapping of a pixel in the distorted image to zero, one, or several pixels in corrected image 100. For example, both pixels 110-1 and 110-2 map to pixel 120-1, while pixel 110-3 maps to 120-2. Many other combinations are possible. The table may also hold weights which indicate the proportion of the distorted pixel value to be used in the corrected image; if the distorted pixels are added to the corrected pixel (which had initially been set to zero) then these weights implement filtering which reduces artifacts of the image warping being performed.

Figure 7:
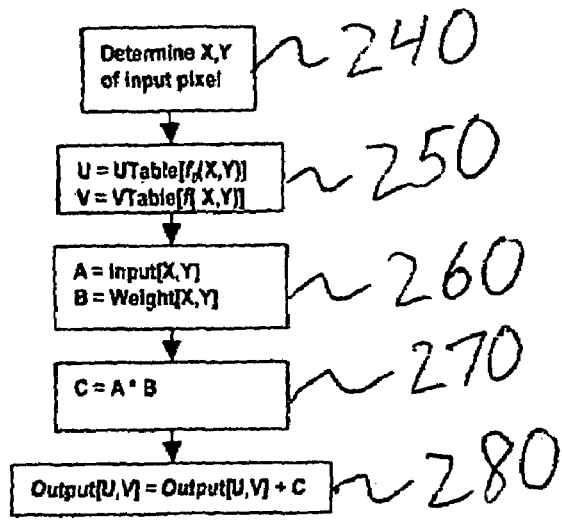
FIG. 7 is a block diagram illustrating a method for producing a corrected pixel with a forward table.

FIG. 7 is a block diagram illustrating a method for producing a corrected pixel with a forward table. In block 240, determine the XY coordinates of the input pixel. In block 250, generate output coordinates U and V using functions $f_o$ and $f$, and the results used as indices into forward mapping tables UTable and Vtable, generating output coordinates (U,V). In block 260, calculate A and B. B is the weight to apply to A. In block 270, calculate C, or the weighted value of pixel at coordinates X,Y. In block 280, calculate the output pixel value, Output [U,V], by modifying with the weight of the input pixel.

FIG. 4 is a diagram illustrating a graphical version of a reverse mapping table. If the table holds a reverse mapping every pixel in corrected image 130 can be mapped to one or more pixels in distorted image 140. Although a one-to-one pixel mapping is sufficient to obtain a complete corrected image, increasing the number of pixels mapped in conjunction with filter weights for each of the mappings can improve the quality of the result. For example, pixel 150-1 maps to pixel 160-1, while adjacent pixel 150-2 maps to non-adjacent pixel 160-2. A simpler though lower quality method of filtering involves limiting the table to a one-to-one mapping but additionally using distorted pixels adjacent to the one specified in the table as input to a filter.

Figure 8:
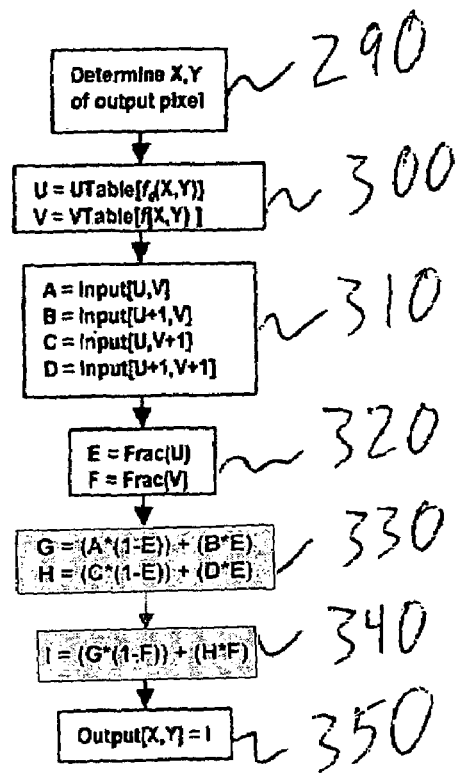
FIG. 8 is a block diagram illustrating a method for producing a corrected pixel with a reverse table.

FIG. 8 is a block diagram illustrating a method for producing a corrected pixel with a reverse table, using a bilinear interpolation to generate the output value. Similar steps can be taken to perform more sophisticated interpolation, for example, bicubic interpolation. In block 290, determine the X,Y coordinates of the input pixel. In block 300, generate output coordinates U and V using functions $f_o$ and $f$, and the results used as indices into forward mapping tables UTable and Vtable, generating output coordinates (U,V). In block 310, calculate A, B, C, and D. In block 320, calculate E and F, or the weights of U and V, respectively. In block 330, calculate G and H. In block 340, calculate I. In block 350, calculate the output pixel value.

Figure 5:
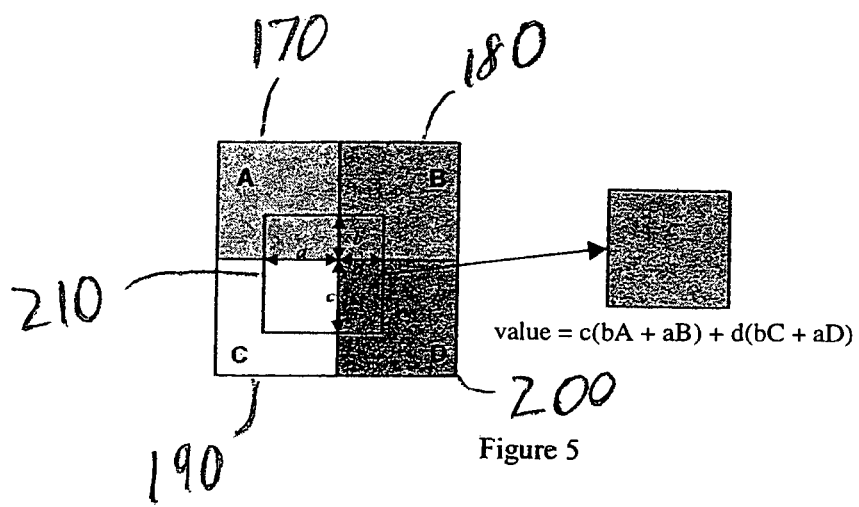
FIG. 5 is a diagram illustrating one example of weighting using a filter.

Referring again to FIG. 4, for either table it is also possible to filter the corrected image after it has been completed, though this may affect quality. A possible implementation of filtering would use the equation:

$$\text{value} = (\text{weight}_a * \text{pixel}_a) + (\text{weight}_b * \text{pixel}_b) + (\text{weight}_c * \text{pixel}_c)$$

which is a weighted sum of selected pixels. FIG. 5 is a diagram illustrating a graphical version of the above equation. The weights may be pre-calculated and held in the table and might be simply based on the number of distorted pixels that are used to form the correct pixel, or might be based on the area of the correct pixel that each distorted pixel contributes (this may not be constant due to edge effects where one distorted pixel contributes to more than correct pixel). For example, pixel 170 is weighted with value "A," pixel 180 is weighted with value "B," pixel 190 is weighted with value "C," pixel 200 is weighted with value "D." A part of each of pixels 170, 180, 190 and 200 make up pixel 210, whose value is calculated by computing an area in each of the known pixels and multiplying the area by the weight of the respective pixel. The area in pixel 170 is a*b, the area in pixel 180 is b*d, the area in pixel 190 is a*c, while the area in pixel 200 is d*c. The value of pixel 210 is the sum of the weighted areas of each underlying pixel. Therefore, the value of pixel 210 is c(bA+aB)+d(bC+aD).

The contents of either the forward or reverse mapping tables may be generated automatically by directing the camera at a test pattern, typically a grid of black lines on a white background. With knowledge about the viewing conditions and relative positions of camera and test pattern, it is straightforward to determine corresponding intersections of horizontal and vertical lines on the test pattern and the distorted image. When the correspondence is known a mapping table is simple to construct and in the context of a production line this may be done automatically. If the camera is deployed, however, aging effects or damage may result in a need to recalculate the tables. As it may be difficult to construct good conditions for automatic calibration it may be necessary to resort to manual calibration in which a service engineer or similar adjusts the correction table until the displayed result is within a required tolerance. To achieve manual calibration is useful to be able to attach a test card to the camera such that it is in a known position and the camera housing may have attachment points to facilitate this. It is also possible that automatic calibration is applied first, followed by manual adjustment, and this is referred to as semi-automatic calibration. Note that the camera may provide some assistance in this procedure by performing operations such as edge enhancement to make the test pattern more easily visible. Alternatively, if the distortion of the optical system is well understood the mapping tables may be generated analytically.

Only those pixels that lie on the marked points of the test pattern have a known mapping, so a test pattern with more points will produce more accurate results. Those pixels which do not have a known mapping may use an interpolated mapping derived by inspecting the mapping of neighboring pixels and estimating a new mapping. The estimation may be done by linear interpolation or a higher-order interpolation as desired. It is possible that this estimation is performed within the camera instead of as part of the table generation. In this case the table may not hold as many entries as previously disclosed, which would have the benefit of reducing the amount of memory needed to hold it. It would, however, increase the computation needed to correct the distorted image by requiring interpolation of intermediate mappings. The opportunity to balance processing power and memory requirements is a useful benefit of the algorithm presented here.

Figure 6:
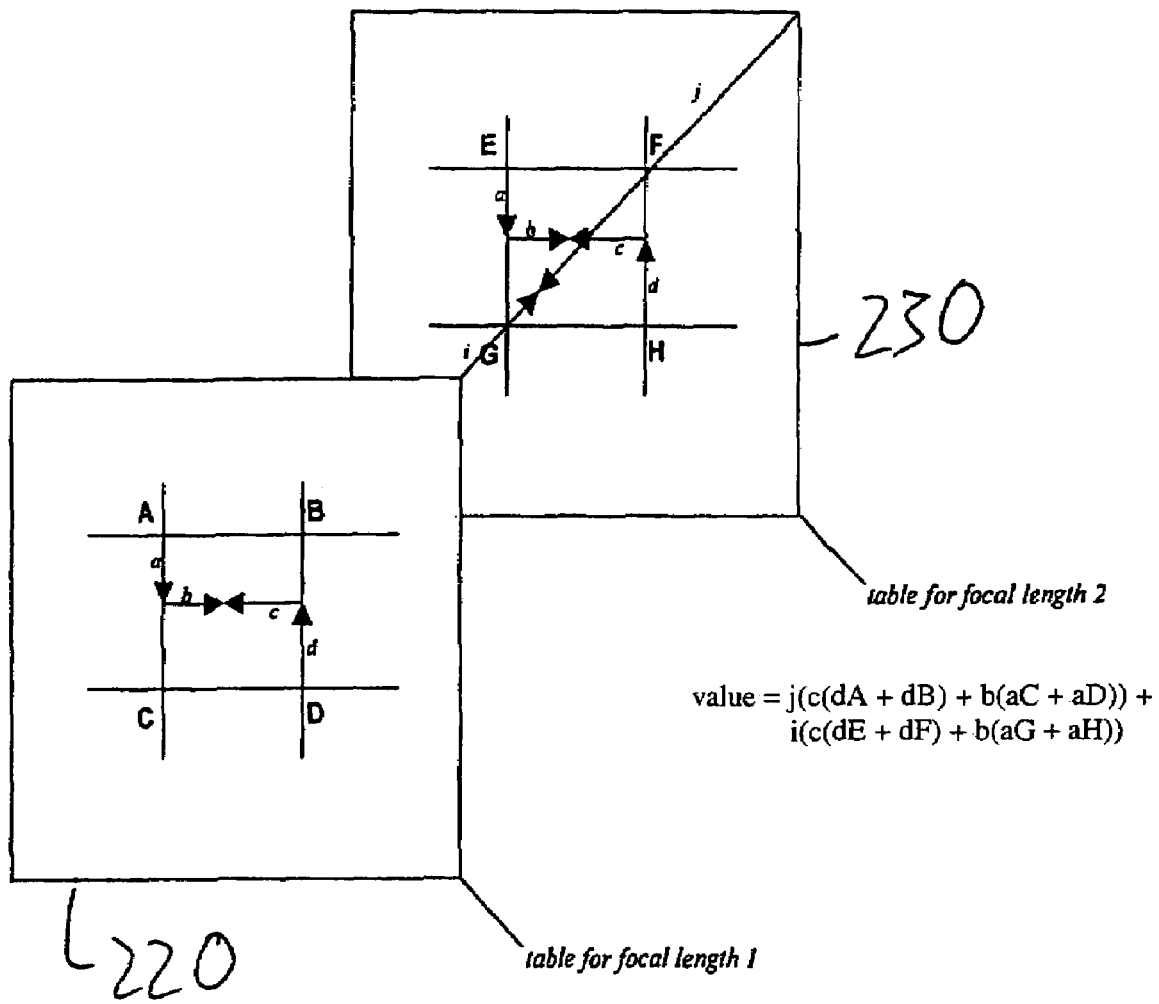
FIG. 6 is a diagram illustrating two tables for interpolating missing entries in three dimensions.

A different mapping table may be constructed for each aperture setting of the optical system if changing the aperture significantly changes the characteristics of the distortion. If the optical system has a variable focal length (e.g. it is a zoom lens) it may be appropriate to generate different mapping table for different focal lengths. FIG. 6 is a diagram illustrating two tables for interpolating missing entries in three dimensions. While the number of apertures is limited and it is possible to construct a table for each, the focal length is usually continuously variable so it is possible that the exact table required will not be available. If tables are constructed for a limited selection of focal lengths then they may be considered to form a lattice and missing entries interpolated in three dimensions. The image processing circuit within the camera may perform the interpolation when it is informed of the setting of lens either automatically or by the user.

For example, table 220 represents a mapping at one focal length while table 230 represents a mapping at another focal length, with "i" the distance from the first focal length and "j" the distance from the second focal length, wherein the point at which "i" and "j" meet is the desired focal length. One point of interest is between points A, B, C, and D of table 220. In order to interpolate between the two tables, value "a" of table 220 is multiplied by C and added to the product of "a" multiplied by D. This sum is then multiplied by the value "b". The value "d" is multiplied by A and added to the product of "d" multiplied by B. This sum is then multiplied by the value "c". For table 230, value "a" is multiplied by G and added to the product of "a" multiplied by H. This sum is then multiplied by the value "b". The value "d" is multiplied by E and added to the product of "d" multiplied by F. This sum is then multiplied by the value "c". The sum of values for table 220 is then multiplied by "j" and added to the product of table 230 and "i," for an interpolated value.

In another embodiment, the projection of the image onto the sensor may be adjusted, for example to improve resolution in selected area. As the image projection is adjusted a different table may be used to correct the distortion.

In general any number of tables may be used to correct any geometric distortion that varies as a function of some parameter of the system.

A separate and distinct mapping table or set of mapping tables may be determined for several different optical systems and held in the camera. The camera may automatically determine the type of optical system in use and the appropriate table used. Alternatively, the table may be held in solid-state memory attached to the optical system such that each optical system presents a set of correction tables to the image processing circuit on attachment to the camera.

The foregoing has described methods for the correction of optical lens distortion by an image processing circuit within a camera that are given for illustration and not for limitation. Thus the invention is to be limited only by the appended claims. Although the invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A camera having reduced distortion from an optical system comprising:
   a) an optical system which captures a wide field of view;
   b) an image sensor which captures a sensed image of said wide field of view through said optical system, and circuitry coupled to said image sensor and configured to convert the output of the image sensor to electrical signals suitable for use by an image processing circuit;
   c) the image processing circuit coupled to the image sensor and configured to provide a correction which reduces optical distortions from the combination of the optical system and the image sensor where the correction includes reference to a table of parameters held in a solid-state memory, attached to said image processing circuit, wherein the table of parameters are specific to the particular combination of said optical system and said image sensor; and
   d) wherein said table maps an individual pixel of a corrected output image to an accurate coordinate in the captured sensed image, wherein pixel values within a local neighborhood of the sensed image are used to provide a weighted sum which provides an estimate of the value at the said accurate coordinate on the sensed image, wherein the weight of each pixel within the local neighborhood is determined by its distance from the accurate coordinate provided by the table.

2. The camera of claim 1 in which the table of parameters has missing entries that are interpolated by the image processing circuit.

3. The camera of claim 1 in which the table of parameters is generated by photographing a test pattern through the optical system to be corrected and applying image processing operations to automatically produce the table of parameters.

4. The camera of claim 3 further comprising:
   points of attachment coupled to the optical system and configured to support the test pattern.

5. The camera of claim 1 in which the table of parameters is generated by photographing a test pattern through the optical system to be corrected and manually constructing the table of parameters.

6. The camera of claim 5 further comprising:
   points of attachment coupled to the optical system and configured to support the test pattern.

7. The camera of claim 1 wherein a plurality of tables of parameters are available to correct distortion for different focal lengths of the optical system, wherein an unrepresented focal length may be corrected by interpolating between some of the plurality of tables of parameters.

8. The camera of claim 1 wherein a plurality of tables of parameters are available to correct distortion for different apertures of the optical system, wherein an unrepresented aperture may be corrected by interpolating between some of the plurality of tables of parameters.

9. The camera of claim 1 wherein a plurality of tables of parameters are stored in the camera.

10. A camera with adjustable image projection distortion correction comprising:
    a) an adjustable optical lens system which produces projection with variable optical geometric distortion;
    b) an image sensor and circuitry coupled to the adjustable optical lens system and configured to convert the output of said adjustable optical system to electrical signals suitable for use by an image processing circuit;

c) said image processing circuit coupled to the image sensor and configured to provide a correction of said optical geometric distortion where said correction includes using multiple geometric distortion parameters to correct optical distortion that varies according to changes in the projection from said adjustable projection optical lens system onto said image sensor and said parameters automatically selected to adjust said projection and unrepresented projections corrected by interpolating between parameters;

d) said multiple parameters used for correction held in solid-state memory within the housing of said adjustable projection optical lens system, and said image processing circuit; and e) an individual pixel created using a weighted sum of a selected group of pixels to be used in said correction, a part of each selected pixel of said group of pixels making up the individual pixel and the group of pixels are proximate to the individual pixel, wherein the weight of each pixel of said group of pixels is determined by its distance from the individual pixel based on their relative coordinates derived from the geometric distortion parameter correction.

11. The camera of claim 10 in which a plurality of tables are configured with multiple geometric distortion parameters to be used to correct optical geometric distortion that varies according to one or more parameters of said optical system, said tables to be automatically selected as said parameter varies and unrepresented parameters corrected by interpolating between said tables.

12. A camera with reduced optical distortion comprising:
a) a detachable optical lens system which captures an ultra-wide field of view;
b) an image sensor and circuitry coupled to the optical system and configured to convert the output of said optical system to electrical signals suitable for use by an image processing circuit;
c) said image processing circuit coupled to the image sensor and configured to provide a correction which reduces optical distortions introduced by the combination of said optical lens system and said image sensor where said correction includes reference to a table of parameters;
d) said table of parameters held in a solid-state memory coupled to and within the housing of said detachable optical lens system, said image processing circuit gaining access to said parameters on attachment of said optical lens system to said camera, wherein the table maps an individual pixel of a corrected image to an accurate coordinate in a sensed captured image, wherein pixel values within a selected group are in a local neighborhood and are used to provide a weighted sum to provide an estimate of the value at the said accurate coordinate on the sensed image, wherein the weight of each pixel within the selected group is determined by its distance from the accurate coordinate as provided by the table.

13. The camera of claim 12 in which the table of parameters has missing entries that are interpolated by the image processing circuit.

14. The camera of claim 12 in which the table of parameters is generated by photographing a test pattern through the optical system to be corrected and applying image processing operations to automatically produce the table of parameters.

15. The camera of claim 14 further comprising:
points of attachment coupled to the optical system and configured to support the test pattern.

16. The camera of claim 12 in which the table of parameters is generated by photographing a test pattern through the optical system to be corrected and manually constructing the table of parameters.

17. The camera of claim 16 further comprising:
points of attachment coupled to the optical system and configured to support the test pattern.

18. The camera of claim 12 wherein a plurality of tables of parameters are available to correct distortion for different focal lengths of the optical system, wherein an unrepresented focal length may be corrected by interpolating between some of the plurality of tables of parameters.

19. The camera of claim 12 wherein a plurality of tables of parameters are available to correct distortion for different apertures of the optical system, wherein an unrepresented aperture may be corrected by interpolating between some of the plurality of tables of parameters.

20. A method of reducing geometric distortion in an optical system comprising:
a) capturing a distorted image of a known test pattern through said optical system;
b) automatically defining a mapping between said distorted image of said test pattern and an undistorted test pattern;
c) constructing a table of mapping information in a form suitable for use by an image processing circuit; and
d) using said image-processing circuit to apply said table to images subsequently or previously captured through said optical systems;
wherein said table maps an individual pixel of a corrected output image to an accurate coordinate in the captured image, wherein pixel values within a local neighborhood are used to provide a weighted sum which provides an estimate of the value at the said accurate coordinate on the captured image, wherein the weight of each pixel within the local neighborhood is determined by its distance from the accurate coordinate as provided by the table.

* * * * *